Oct. 6, 1953       E. B. THOMPSON       2,654,443
METHOD AND DEVICE FOR RAISING VEHICLES
Filed Oct. 29, 1951                     2 Sheets-Sheet 2
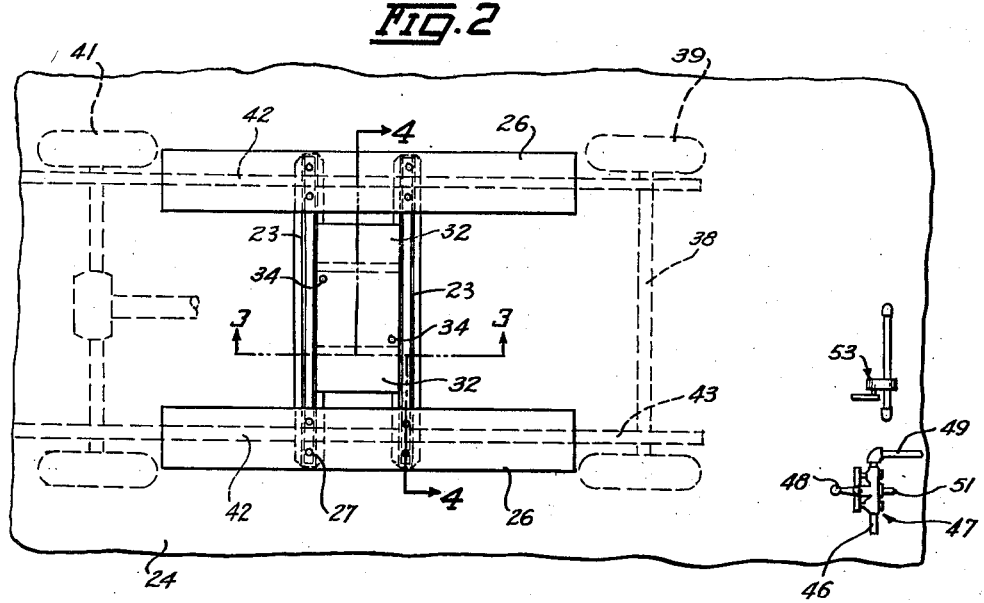
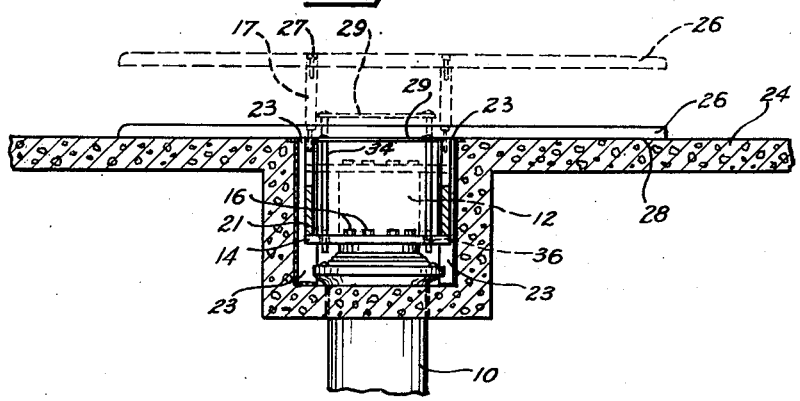
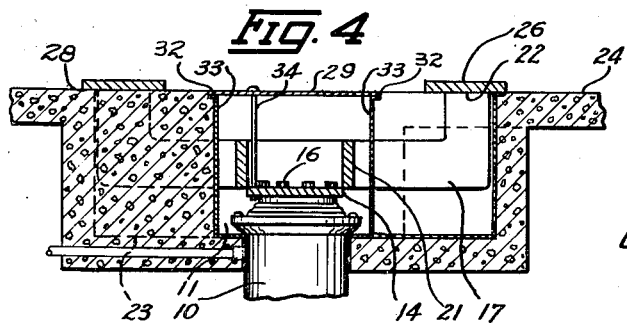
INVENTOR.
ELMER B. THOMPSON
BY
ATTORNEY.

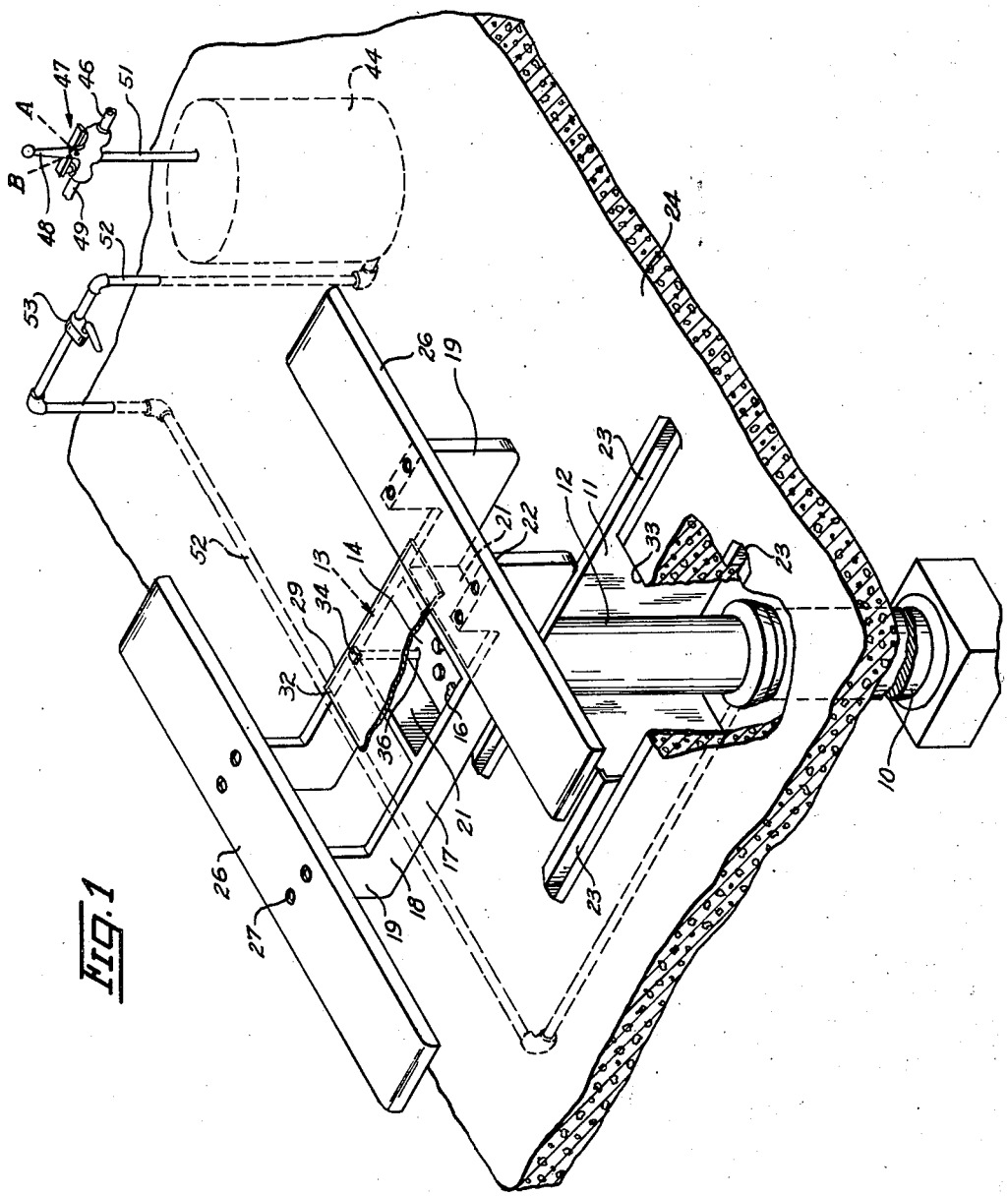

Patented Oct. 6, 1953

2,654,443

UNITED STATES PATENT OFFICE 2,654,443

METHOD AND DEVICE FOR RAISING VEHICLES

Elmer B. Thompson, Des Moines, Iowa, assignor to Globe Hoist Company, Des Moines, Iowa, a corporation of Iowa Application October 29, 1951, Serial No. 253,607

2 Claims. (Cl. 187—8.41)

1

This invention relates generally to vehicle lifts or hoists and in particular to a method and apparatus for raising a vehicle by engaging the main frame of the vehicle so as to leave the underside of the vehicle freely accessible for lubrication purposes. This application relates to the same subject matter as my copending application Serial No. 65,007, now Patent #2,593,690.

An object of this invention is to provide an improved vehicle lift.

A further object of this invention is to provide a method and apparatus for raising a vehicle wherein upwardly directed forces are transmitted from a single lift member to the side portions of the vehicle main frame to thereby raise the vehicle.

A further object of this invention is to provide a vehicle lift of single post pit-mounted type capable of engaging the main frame of a vehicle for raising purposes so as to render the underside of the vehicle substantially open for lubricating purposes, and which in a raised or lowered position leaves the floor space therefor free of any hazardous obstructions or floor openings.

Further objects, features and advantages of this invention will become apparent from the following description when taken in connection with the accompanying drawing in which:

Fig. 1 is a perspective view of the hoist of this invention shown in a raised position and with certain parts broken away to more clearly show its construction;

Fig. 2 is a plan view of the hoist shown in a lowered position;

Fig. 3 is an enlarged sectional view as seen on the line 3—3 in Fig. 2; and

Fig. 4 is a sectional view taken substantially on the line 4—4 in Fig. 2.

With reference to the drawings the hoist of this invention is illustrated in Fig. 1 as including a cylinder 10 mounted in a floor pit 11 formed in the floor surface 24, and operatively associated with a piston or lifting member 12.

A vehicle frame engaging and supporting structure, indicated generally as 13 and mounted on the upper end of the piston 12, includes a base plate 14 (Figs. 1 and 4) of a substantially square shape attached to the piston 12 by bolts 16. Extended transversely of the hoist and in a parallel relation spaced longitudinally of the hoist are a pair of upright plate members 17 of a substantially U-shape, each of which has a base section 18 and upright leg sections 19. The lower sides of the central portions of the base sections 18 are secured as by welding to the transversely extended sides of the base plate 14.

2

Brace members 21, comprised of transversely spaced longitudinal upright plate members, are arranged between the U-members 17 and connected as by welding, to the longitudinal sides of the base plate 14 and to the inner sides of the U-shape plate members 17.

It is seen, therefore, that the base plate 14, brace members 21 and the central portions of the base sections 18 form a box assembly which is located intermediate the leg sections 19 of the U-shape plate members 17. Also the upper sides of the brace members 21 and of the base sections 18 are located in a common horizontal plane which is positioned below a common horizontal plane for the upper ends 22 of the leg sections 19.

The pit 11 is of a size to receive therein the above described box assembly, when the hoist is in a lowered position. In this lowered position of the hoist, the U-shape plate members 17 are received within a pair of corresponding transversely extended slots 23 formed in the floor surface 24 and arranged in a parallel relation at opposite sides of the pit 11 so that the central portions of the slots 23 are open to the pit 11. In other words, the overall floor opening is of a substantially H-shape, with the pit 11 constituting an enlarged cross bar between the floor slots 23, and with the slots 23 being of a depth sufficient to accommodate therein, to a level below the floor surface 24, the upright leg sections 19.

Extended across the transverse plate members 17 and secured to the upper ends 22 of corresponding leg sections 19 are a pair of vehicle frame engaging or contact members 26 of a horizontal flat plate construction extended longitudinally of the hoist. Each frame engaging member 26 is secured to its corresponding leg sections 19 by counter-sunk screws 27.

When the piston 12 is in a lowered position, as shown in Figs. 3 and 4, the bottom side 28 of a frame contact member 26 rests directly on the top of the floor surface 24 and in a covering relation with the outer ends of the floor slots or openings 23. The slots 23 are of a relatively narrow width, and on the order of about two inches wide, so that when the transverse plate members 17 are received therein the portions of the slots 23 between the frame contact members 26, can remain uncovered to permit the walking of a garage man or lift operator thereover without fear of having a foot slip into, or getting caught within, a slot.

In order to cover the floor pit 11, when the hoist is in a lowered position, there is provided a cover member 29 (Figs. 1 and 3) of a substantially rectangular shape, having a width equal substantially to the longitudinal length of the floor pit 11 and a length enough longer than the longitudinal dimension of the floor pit 11 to provide for the cover ends 32 being supported in resting engagement on the pit side walls 33. The cover member 29 is movably and guidably supported relative to the base plate 14 by the provision of a pair of guide pins 34 arranged diagonally of the cover member 29 and extended downwardly therefrom for loose reception within a pair of corresponding openings 36 formed in the base plate 14.

Thus, when the lift is in its lowered position within the pit 11, the cover member 29 (Figs. 3 and 4) is in resting engagement on the floor surface 24 and in a covering relation relative to the pit 11. On upward movement of the piston 12, the cover member 29 remains in a supported position on the floor 24 until the contact members 26 are raised to their dotted line positions shown in Figs. 3 and 4, at which the lower side of the cover member 29 is engaged by the upper sides of the brace members 21. During this initial raising of the piston 12, the base plate 14 is moved upwardly relative to the guide pins 34. When the cover member 29 is engaged by the brace members 21, it is moved upwardly as a unit with the lift.

When the lift is lowered within the pit 11, the cover member 29 is moved downwardly with the lift until the ends 32 thereof are in resting engagement with the side walls 33 of the pit 11. Further downward movement of the cover member 29 is thus arrested, while the lift continues its downward movement to a position within the floor pit 11 below the level of the floor surface 24.

In the operation of the hoist, the piston 12 is initially in a lowered position within the pit 11, with the contact members 26 supported on the floor surface 24. A vehicle, indicated in dotted lines at 38 in Fig. 2, is then driven over the hoist in a direction parallel with the contact members 26 to a position such that the members 26 are located between the vehicle front wheels 39 and rear wheels 41 in a direction fore and aft of the vehicle. The contact members 26 are spaced a distance apart on the upright plate members 17 corresponding substantially to the transverse dimension of the vehicle 38 to provide for the engagement of the side frame members 42 of the vehicle main frame or chassis 43 by the contact members 26 when the hoist is elevated. The width of the contact members 26 is such to provide for the engagement of the side frame members 42 by the contact members, without requiring an exact centering of the frame members 42 relative to the hoist.

It is to be noted that the location of the vehicle frame 43 with the contact members 26, between the front wheels 39 and rear wheels 41, takes place without regard to the wheel base of the vehicle 38. As a result the usual adjustment of axle engaging members, now generally used in hoists of commercial type, is entirely eliminated with a resultant saving in time and lack of inconvenience to the lift operator.

On elevation of the piston 12 to raise the vehicle 38, the lower sides of the vehicle frame members 42 are directly engaged by the top sides of the contact members 26. Since the contact members 26 are of a length corresponding substantially to the distance between the front wheels 39 and the rear wheels 41 of the vehicle, the vehicle is positively supported against both lateral and longitudinal tilting movement. Due to the transverse spacing of the contact members 26, and their extension longitudinally of the vehicle along opposite sides of the vehicle, they are substantially out of the way of a mechanic or lubricating man working on the underside of the vehicle. In this connection, it is to be noted that due to the U-shape of the transverse plate members 17 and the arrangement of the braces 21 substantially within the dimensional confines of the piston 12, access to the underside of the vehicle, at a location directly above the piston 12, is made possible by virtue of the open space between a contact member 26 and an adjacent brace member 21. This accessibility is further increased by the arrangement of the brace members 21 and the base sections 19 of the transverse plate members 17 below the level of the contact members 26.

The piston 12 is raised and lowered in a usual manner by means including a buried oil tank 44 (Fig. 1) connected with a compressor or the like (not shown) by an air inlet pipe 46 equipped with an air control valve, indicated generally at 47, and including a control lever 48 and an exhaust port 49. On movement of the lever 48 to its dotted line position shown at A, air under pressure is supplied to the tank 44 through the line 51; on movement of the lever 48 to its neutral full line position shown in Fig. 1, air is prevented from travelling through the line or pipe connection 51; and on movement of the lever 48 to its dotted lined position shown at B, air is exhausted from the tank 44 through the exhaust outlet 49.

The tank 44 is connected with the cylinder 10 through an oil supply line 52 provided with an oil control valve 53. The oil valve 53 and air valve 47 are conveniently located near each other at positions above the floor 24 for concurrent actuation by the hoist operator.

Although the invention has been described and illustrated with respect to a preferred embodiment thereof it is to be understood that it is not to be so limited since changes and modifications can be made therein which are within the full intended scope of this invention as defined by the appended claims.

I claim:

1. The method for raising automotive vehicles above a floor surface to provide access to the underside of the vehicle, wherein said vehicle has front and rear wheels and a main frame, including a pair of spaced side members having exposed undersides and extended longitudinally over at least a portion of the distance between said front and rear wheels; which comprises engaging only the exposed underside of each of said frame side members over a portion of the lengths thereof between said front and rear wheels, providing a single upwardly directed force between said side members, and concurrently transmitting said force directly to said side members.

2. A hoist for elevating an automotive vehicle above a floor surface to provide access to the underside of the vehicle, wherein the vehicle has front and rear wheels and a pair of transversely spaced longitudinally extended side frame sections having exposed undersides and including portions arranged between said front and rear wheels, said hoist including a single lift member located substantially intermediate said frame portions and between said front and rear wheels when the vehicle is in a position to be elevated, a superstructure of an open construction supported solely on said lift member, and including transversely spaced portions for engaging the undersides of said frame portions at longitudinally spaced positions thereon between said front and rear wheels, with said superstructure being located within the transverse dimension of the vehicle and between said front and rear wheels when the vehicle is in a position to be elevated.

ELMER B. THOMPSON.

References Cited in the file of this patent

UNITED STATES PATENTS

| Number | Name | Date |
|---|---|---|
| 94,680 | Wells | Sept. 7, 1869 |
| 123,308 | Todd | Jan. 30, 1872 |
| 1,002,797 | Appleton et al. | Sept. 5, 1911 |
| 2,100,617 | Thompson | Nov. 30, 1937 |
| 2,124,726 | Blum | July 26, 1938 |
| 2,458,986 | Frey | Jan. 11, 1949 |
| 2,593,635 | Walker | Apr. 22, 1952 |

FOREIGN PATENTS

| Number | Country | Date |
|---|---|---|
| 492,076 | Great Britain | Sept. 14, 1938 |
| 497,847 | Belgium | Dec. 16, 1950 |